June 18, 1957     T. A. HERBERT, JR     2,796,510
METHOD OF RESISTANCE WELDING SANDWICH PANELS
Filed Oct. 10, 1955

INVENTOR.
T. A. HERBERT JR.
BY George Stell
AGENT

United States Patent Office 2,796,510
Patented June 18, 1957

2,796,510

METHOD OF RESISTANCE WELDING SANDWICH PANELS

Thomas A. Herbert, Jr., Chula Vista, Calif., assignor to Rohr Aircraft Corporation, Chula Vista, Calif., a corporation of California Application October 10, 1955, Serial No. 539,516

3 Claims. (Cl. 219—83)

The invention relates to a metallic sandwich panel and to an apparatus and method for constructing a metallic sandwich panel in which the ends of a metallic cellular core are resistance welded to the opposing faces of two metallic skins and is particularly directed to the construction of a metallic sandwich panel in which the skins and core are made of extremely thin metal.

In constructing sandwich panels of very thin metal in which the ends of the cellular core are secured to the faces of the skins by a welding or brazing operation, considerable difficulty has heretofore been encountered in securely attaching all of the ends of the cell walls to the faces of the skins due to the flexibility of the thin metal. The thin metal skins are also inclined to wrinkle or buckle when heat is applied thereto during the welding operation resulting in the surfaces of the completed panel being badly distorted. Further difficulty has been encountered in that the thin metal is easily oxidized or burned during the welding operation frequently rendering the completed panel unfit for most purposes.

An object of this invention is, therefore, to provide a method and apparatus for making a metallic sandwich panel as above described in which all of the ends of the cell walls are securely attached to the faces of the skins.

A further object is to provide a method and apparatus for making a sandwich panel of thin metal having relatively smooth and undistorted surfaces.

Another object is to provide a method and apparatus for making a sandwich panel of thin metal in which the metal is not burned or oxidized during the welding operation.

Still another object is to provide a sandwich panel composed entirely of a single metal alloy as, for example, stainless steel and in the assembly of which no brazing alloy is required.

These and other objects and advantages will become apparent as the description of the invention proceeds.

For a better understanding of the invention reference is made to the accompanying drawing illustrating a preferred embodiment thereof and in which.

Figures 1, 2, 3:
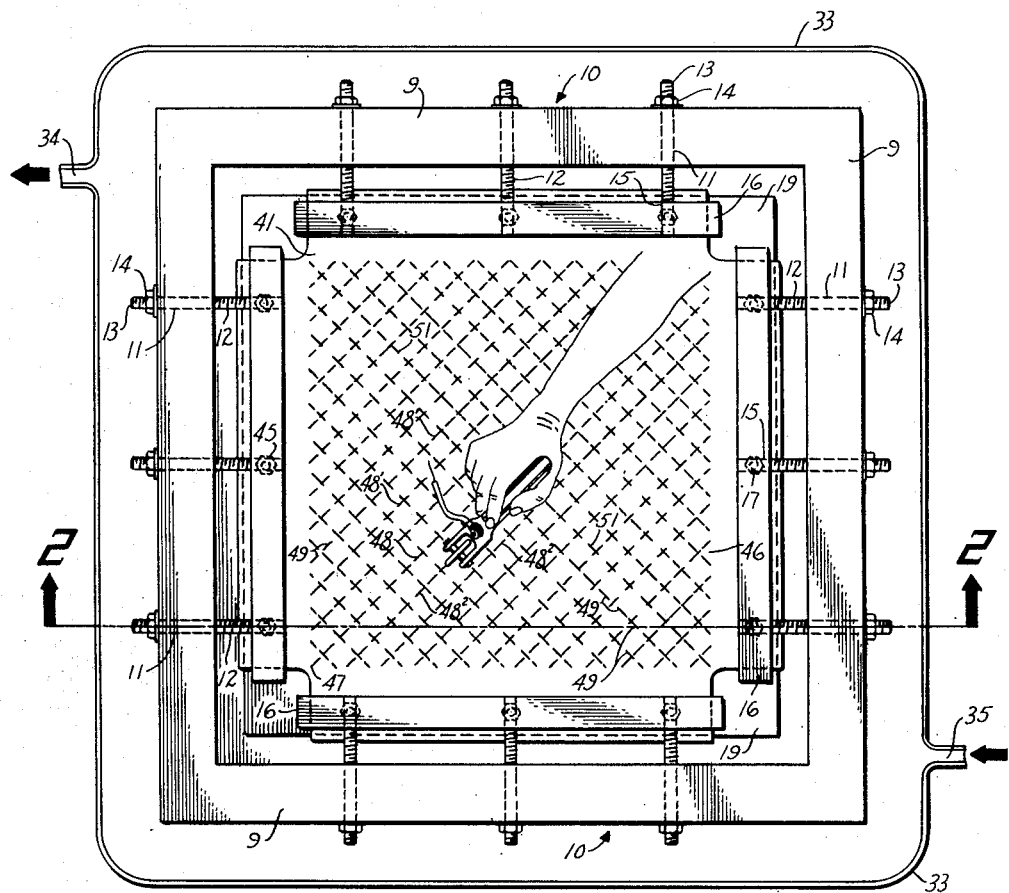
Fig. 1 is a top view of the apparatus with portions thereof omitted for clarity.
Fig. 2 is a cross sectional view taken on line 2—2 of Fig. 1 with parts of the apparatus shown schematically.
Fig. 3 is a perspective of a portion of a sandwich panel.

With reference to the drawing the apparatus comprises a rigid frame 10 preferably made of a dielectric material and having spaced apart openings 11 extending through the sides 9 thereof within which a series of threaded rods 12 are slidably contained. The outer ends 13 of threaded rods 12 are provided with similarly threaded nuts 14 and the inner ends 15 of rods 12 are secured to bars 16 disposed within frame 10. Bars 16 are preferably made of a dielectric material and are provided with spaced apart openings 17 in which bolts 18 are threadedly engaged for a purpose to be explained. A metal supporting plate 19 which is preferably made of metal having high electrical conductivity, such as copper or copper alloy, is positioned within frame 10. An electrical transformer 20 of a known type generally used for resistance welding, having a primary coil 21 connected to a source of electrical current (not shown) by leads 22 and a one turn secondary coil 23 having leads 24 and 25 extending therefrom, provides a source of electrical welding current. One of leads 22 is connected to a variable resistor 26 to provide means for regulating the amount of electrical current supplied to transformer 20. Lead 24 of coil 23 is connected to plate 19 by a connector 27 and lead 25 is connected to a roller support 28 having a roller 29 rotatably attached thereto. Roller support 28 and roller 29 are preferably made of a metal having high electrical conductivity similar to plate 19 and support 28 is provided with a handle 30 made of a dielectric material and adapted to be grasped by a workman. The peripheral edge 31 of roller 29 is semi-circular in shape as shown in Fig. 1 for a purpose to be explained. Frame 10, plate 19 and roller 29 are enclosed within a transparent flexible plastic container or envelope 33 having an outlet 34 and an inlet tube 35. Container 33 may be made of any of the known transparent flexible organic plastics such as cellophane, polyvinyl alcohol, polyvinyl chloride or the like and is provided with an opening (not shown) through which the apparatus described is inserted and the opening closed by any suitable means (not shown). Leads 24 and 25 pass through end wall 36 of container 33, wall 36 being hermetically sealed around each lead, care being taken to have the portion of lead 25 within enclosure 33 of sufficient length to permit roller 29 to be moved as desired. Enclosure 33 is also provided with an integral sleeve 38 through which a workman's arm may be extended as shown in Fig. 2, sleeve 38 being provided with means such as an elastic binding 37 which causes the sleeve to fit snugly about the arm. The entire apparatus is supported on a suitable insulating support indicated at 32.

To use the apparatus in constructing a metallic sandwich panel of very thin material, a metallic cellular core 39 made of a metal such as stainless steel and ranging in thickness from .001 to .005 of an inch, in which each of the side walls 49 of the abutting cells is provided with openings 50 (Fig. 3) passing therethrough, is placed on surface 40 of plate 19. A metallic skin 41 which is made of a metal such as stainless steel and ranges in thickness from .002 to .010 of an inch is placed on the upper end 42 of core 39. Skin 41 is preferably of such size that the edges 43 thereof project out beyond the sides 44 of core 39 for a substantial distance as shown in Fig. 2. Ends 43 of skin 41 are provided with spaced apart openings 45 through which bolts 18 pass to secure edges 43 to bars 16. Nuts 14 are now rotated to draw rods 12 outwardly through openings 11 to apply tension to skin 41 causing it to present a smooth even surface to the end 42 of core 39. Skin 41 and core 39 are preferably positioned relative to each other so that as tension is applied to skin 41, the skin is drawn downwardly against end 42 of core 39 with a light pressure to provide a firm contact between end 42 and skin 41 and also cause end 42 to be visibly defined in the top surface 46 of skin 41. The entire apparatus is enclosed in envelope 33, as before described, and an inert gas such as argon or helium is admitted into the envelope through inlet tube 35 forcing the air therein out through outlet opening 34. When the air has been completely evacuated from envelope 33 and all the cells of core 39, the workman inserts his arm through sleeve 38 and grips handle 30 of roller support 28 to perform the welding operation. The openings 50 between the cells permit the air therein to escape and to be replaced by the argon or other inert gas.

The welding operation is performed by supplying electrical current to transformer 20 and pressing roller 29 against the surface 46 of skin 41 at a point directly above the end 47 of the line 48 extending obliquely across the approximate center of core 39 and skin 41 along which corresponding sidewalls 49 of abutting cells lie. The roller is moved along skin 41 above line 48 to the opposite end thereof thereby welding the skin to those walls of all the cells which lie along line 48. The peripheral edge 31 of roller 29 being semi-circular is in contact with only a very narrow area of skin 41 over line 48 so that only the portion of skin 41 directly over line 48 has pressure applied thereto.

The welding operation is continued by moving roller 29 along surface 46 of skin 41 directly above lines $48^1$ and $48^2$ extending along opposite sides of line 48 and along which the corresponding sidewalls 49 of the successive rows of abutting cells on each side of line 48 lie. Roller 29 is moved along skin 41 alternately above lines $48^1$ and $48^2$ beginning with the lines lying adjacent to line 48, until all of sidewalls 49 along those lines are welded to skin 41. The above described operation is then repeated beginning on the line 51 extending obliquely across the approximate center of skin 41 and core 39 and normal to line 48, along which corresponding sidewalls 49 of abutting cells lie, to complete the welding operation by which the entire end 42 of core 39 is welded to skin 41.

The above described welding operation being started on line 48 extending obliquely across the center of skin 41 and core 39, and being continued by alternately welding cell walls 49 which lie along lines $48^1$ and $48^2$ on opposite sides of line 48, to skin 41, beginning with the lines adjacent to line 48, permits any expansion of skin 41 due to the heat produced by the welding operation to be taken up by the tension applied to edges 43 thereof. This prevents skin 41 from buckling or wrinkling during the welding operation so that the surfaces of the completed panel will be smooth and undistorted. When the entire end 42 of core 39 is secured to skin 41, nuts 14 on rods 12 are rotated permitting the rods to move inwardly relieving the tension on skin 41 and bolts 17 are then withdrawn from bars 16 releasing edges 43 of skin 41. To apply a second skin to core 39, surface 46 of skin 41 is placed on plate 19, the second skin placed on top of core 39 and the process above described is repeated.

Core 39 being composed of very thin material, the end 42 thereof may be easily damaged an amount which, while not noticeable, prevents contact between the ends of side walls 49 and skin 41 in very small areas during the welding operation. The welding current passing through skin 41 and core 39 will arc across the resultant small gap between the skin and core and frequently cause the metal in these areas to be severely oxidized and weakened. By enclosing the entire apparatus within container 33 and evacuating the air therefrom by filling the container with an inert gas, any arcing of the welding current across small gaps between end 42 and skin 41 is precluded from oxidizing or burning the metal by the absence of oxygen. Container 33 being made of flexible transparent plastic does not impede the movements nor obscure the vision of a workman carrying out the welding operation.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. In the construction of a metallic sandwich panel, means for securing a thin metallic skin having a thickness of from .002 to .010 of an inch to the upper end of a metallic cellular core, comprising: a rigid frame composed of a dielectric material surrounding said core; a metallic plate arranged to support said core within said frame, said plate being composed of metal having high electrical conductivity; means connected to said frame constructed to engage the edges of the skin and apply tension thereto in all directions and to draw said skin downwardly against the upper end of said core with sufficient force to visibly define the upper end of said core in the upper surface of said skin; means for pressing successive portions of said skin against the ends of the corresponding walls of a row of abutting cells of said core, said pressing means being composed of metal having high electrical conductivity; and means connected to said pressing means and to said plate for passing an electrical welding current through said skin and core.

2. The method of securing a face of a thin metallic skin to the end of a metallic cellular core comprising the steps of placing said core on a support having high electrical conductivity; placing a skin having a thickness of from .002 to .010 of an inch on the upper end of said core, applying tension to said skin in all directions and simultaneously drawing said skin downwardly against the upper end of said core with sufficient force to visibly define the upper end of said core in the upper surface of said skin; passing a narrow metallic pressing means along the top of the skin to press successive portions of said skin against the upper ends of the corresponding walls of a row of abutting cells of said core; and simultaneously directing an electrical welding current through said skin and core.

3. The method of securing a face of a thin metallic skin to the end of a metallic cellular core comprising the steps of placing said core on a support having high electrical conductivity; placing a skin having a thickness of from .002 to .010 of an inch on the upper end of said core; applying tension to said skin in all directions passing a metallic roller along the top surface of said skin above a narrow line extending across the approximate center of said core to press successive narrow portions of said skin against the ends of the corresponding walls of a row of abutting cells of said core along said line while simultaneously passing an electrical welding current through said roller, skin and core to weld said skin to the end of said core along said line; passing said metallic roller along the top surface of said skin alternately above lines extending along opposite sides of said first line and along which the ends of the corresponding walls of successive rows of abutting cells of the core are disposed, while simultaneously passing an electrical welding current through said roller, skin and core to weld said skin to the end of said core along said lines.

References Cited in the file of this patent

UNITED STATES PATENTS

| | | |
|---|---|---|
| 1,006,536 | Dean | Oct. 24, 1911 |
| 2,056,563 | Budd et al. | Oct. 6, 1936 |
| 2,163,590 | Ganahl et al. | June 27, 1939 |
| 2,326,296 | Harrison | Aug. 10, 1943 |
| 2,327,265 | Herr | Aug. 17, 1943 |
| 2,333,600 | Trautvetter | Nov. 2, 1943 |
| 2,342,025 | Watter | Feb. 15, 1944 |
| 2,397,646 | Brown et al. | Apr. 2, 1946 |
| 2,459,812 | Griffiths | Jan. 25, 1949 |